United States Patent [19]

Prelat

[11] Patent Number: 5,445,453
[45] Date of Patent: Aug. 29, 1995

[54] METHOD FOR AIRBORNE SURVEYING WHICH INCLUDES THE DETERMINATION OF THE APPARENT THERMAL INERTIA OF THE MATERIAL BEING SURVEYED

[75] Inventor: Alfredo E. Prelat, Houston, Tex.

[73] Assignee: Texaco Inc., White Plains, N.Y.

[21] Appl. No.: 219,044

[22] Filed: Mar. 28, 1994

Related U.S. Application Data

[62] Division of Ser. No. 950,519, Sep. 25, 1992, abandoned.

[51] Int. Cl.⁶ ............... G01N 25/20; G01N 25/00; G01V 8/02
[52] U.S. Cl. ..................... 374/43; 374/142; 374/136; 250/253; 250/330
[58] Field of Search ............ 374/43, 6, 142, 136; 250/330, 339.04, 253, 339.11; 356/303

[56] References Cited

U.S. PATENT DOCUMENTS

| | | | |
|---|---|---|---|
| 4,005,289 | 1/1977 | Del Grande | 250/339.04 |
| 4,616,134 | 10/1986 | Pruett et al. | 250/339.11 |
| 4,678,911 | 7/1987 | Sundberg et al. | 250/253 |
| 5,045,937 | 9/1991 | Myrick | 348/144 |
| 5,121,993 | 6/1992 | Carrigan et al. | 374/136 |
| 5,149,959 | 9/1992 | Collins et al. | 250/339.02 |

FOREIGN PATENT DOCUMENTS

| | | | |
|---|---|---|---|
| 2517631 | 7/1976 | Germany | 250/253 |
| 0263834 | 1/1989 | Germany | 374/136 |
| 0742851 | 6/1980 | U.S.S.R. | 250/253 |
| 1763956 | 9/1992 | U.S.S.R. | 250/253 |

OTHER PUBLICATIONS

F. A. Kruse, et al. "Mapping Physical Properties of Geologic Materials by Integration of Diverse Multi-spectral Image Data Sets From The Geologic Remote Sensing Field Experiment" Igarss '90 vol. 2–May 20, 1990.

A. B. Kahle–"Surface Emittance, Temperature, and Thermal Inertia Derived From Thermal Infrared Multi-spectral Scanner (tims) Data For Death Valley, Calif." Geophysics, vol. 52, No. 7, Jul. 1981.

K. Watson–"Regional Thermal-Inertia Mapping From An Experimental Satellite" Geophysics, vol. 47, No. 42, Dec. 1982.

English Abstract of JA 60-249083, published Dec. 9, 1985 (Only abstract considered).

*Primary Examiner*—Diego F. F. Gutierrez
*Attorney, Agent, or Firm*—James L. Bailey; Kenneth R. Priem; William J. Beard

[57] ABSTRACT

A method for airborne surveying is disclosed to acquire, process and calculate the apparent thermal inertia of earth surface materials during flight and by post-flight processing. Two separate airborne surveys are conducted during a diurnal solar cycle to determine the maximum and the minimum radiant temperatures of the earth surface materials. The albedo of the earth material is determined and is used to calculate the apparent thermal inertia of the earth surface materials. Spatial rectification of the two surveys is accomplished by use of differential global positioning.

3 Claims, 2 Drawing Sheets

METHOD FOR AIRBORNE SURVEYING WHICH INCLUDES THE DETERMINATION OF THE APPARENT THERMAL INERTIA OF THE MATERIAL BEING SURVEYED

This is a division of patent application Ser. No. 07/950,519, filed Sep. 25, 1992, now abandoned.

THE FIELD OF THE INVENTION

The present invention relates to an airborne multi-spectral sensor system that utilizes real-time acquisition of images in many narrow, contiguous spectral bands, to generate hyper-spectral image data, and in particular to image data sets which can be used individually or combined to get spectral profiles and emittance to identify ground targets.

THE PRIOR ART

There are many known apparatus for making airborne surveys to terrain for many purposes. These apparatus generally have a plurality of optical scanning devices which are directed toward the ground and form images which are translated into electronic signals for rapid comparison by computers. For example U.S. Pat. No. 4,908,705 shows a steerable wide-angle imaging system which is particularly effective for high speed, low altitude reconnaissance. U.S. Pat. No. 4,939,369 discloses and imaging and tracking system which utilizes multiple arrays of sensors. U.S. Pat. No. 5,028,998 concerns a system which provides an electronic zoom feature to effectively produce a constant altitude picture as the terrain varies while the airborne platform remains at a constant average altitude. U.S. Pat. No. 5,047,783 provides for improved imaging from radiation detectors by noise cancellation. U.S. Pat. No. 5,116,118 describes another airborne imaging system.

SUMMARY OF THE INVENTION

The present invention is an airborne multi-spectral sensor system that utilizes real-time acquisition of images in many narrow, contiguous spectral bands, to generate hyper-spectral image data. The thus achieved image data sets are used individually or combined to obtain spectral profiles and emittance to identify ground targets. The subject system will provide simultaneous information about temperatures and albedos from which the apparent thermal inertia of materials can be calculated and thus define heat flow patterns from the interior and surface of the earth during a 24-hour thermal cycle. The subject system is particularly useful in exploration for natural resources as well as for environmental assessment.

An object of the present invention is to provide a method and apparatus to acquire, process and calculate the apparent thermal inertia of materials. The present invention preferably measures and compares the thermal emittance from the earth's surface between 8 $\mu$m to 12 $\mu$m, but the principles of the present invention equally apply to all portions of the thermal infrared spectrum.

BRIEF DESCRIPTION OF THE DRAWINGS

The present invention will now be described, by way of example, with reference to the accompanying drawings in which.

DETAILED DESCRIPTION OF THE PREFERRED EMBODIMENT

Figure 1:
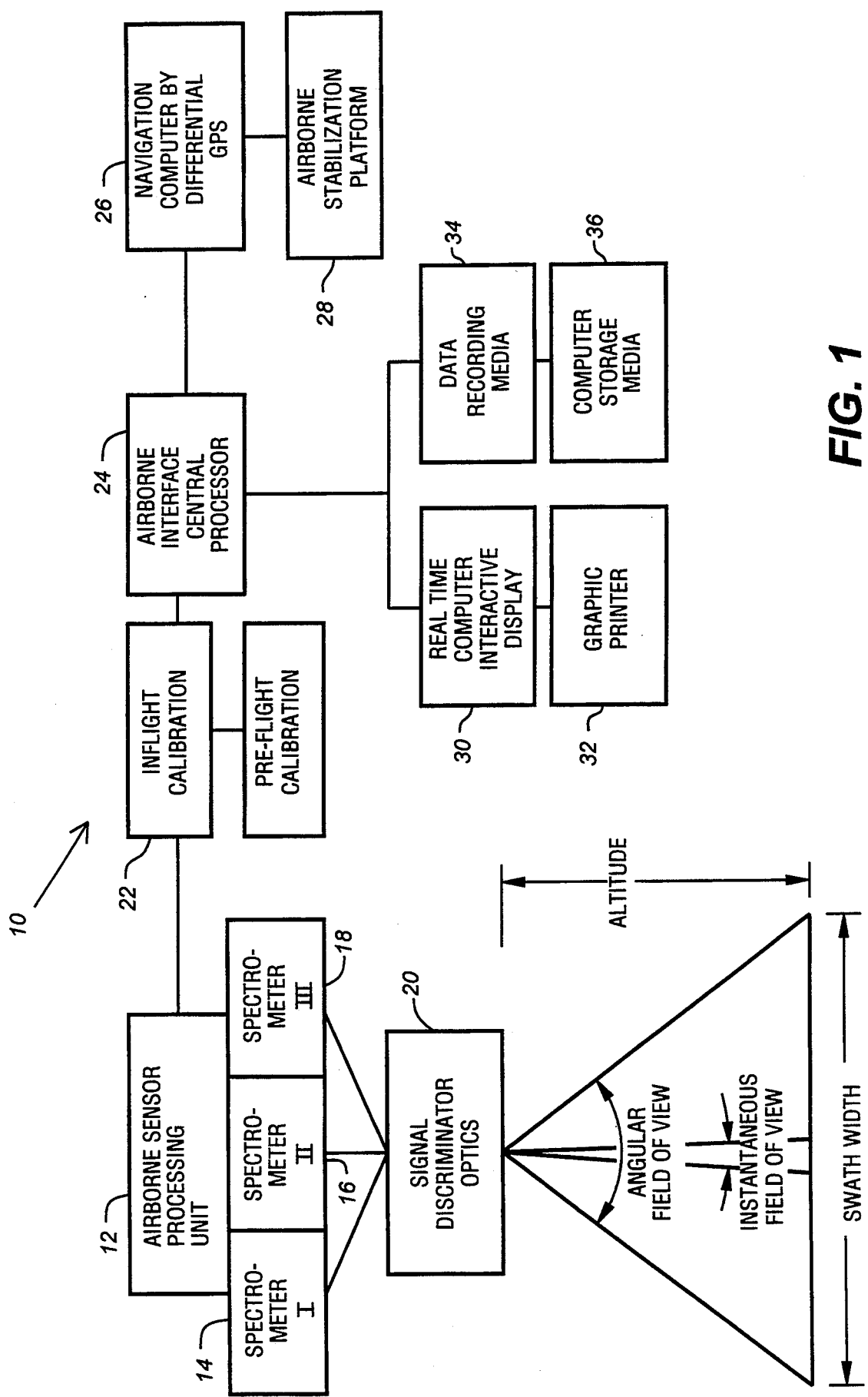
FIG. 1 is a block level schematic of the system of the present invention.

Referring now to FIG. 1, the subject system 10 has an airborne sensor processing unit 12 which includes a first plurality of spectrometers 14 forming a first contiguous selectable band from 400 to 1140 nanometers, a second plurality of spectrometers 16 forming a second contiguous band from 1400 to 2500 nanometers, and a thermal sensor array 18 formed with two configurations with the first having at least six bands running from 8.40 to 11.70 $\mu$m and the second having at least seven bands running from 8.35 to 11.45 $\mu$m. The three spectrometers 14, 16, 18 are each connected to receive input from a signal discriminator 20 having a plurality of optical sensors (not shown) of known type. These sensors would provide optical imaging for a known field of view which, at a given known altitude, will cover a determinable swath width. The sensors, by selection, would also be capable of providing an instantaneous field of view. The processing unit 12 is connected to a two stage calibration means 22 which provides the capability for both in-flight and pre-flight calibration of the system. The system further includes a central processor unit 24 which is connected to receive data from the processing unit 12 as well as from airborne navigation means 26 and platform stabilization 28 in order to correctly relate the scanned data to the earth's surface. The central processor unit 24 also is connected to output devices including a real time display means 30, graphic printer 32, data recording means 34, and data storage means 36.

It is important to the present invention that the spectrometers be selected such that the signal to noise ratio in the first spectrometer array is more than 500, and more than 100 for the second array. The noise-equivalent temperature difference should be @ 300° K. from 0.1 to 0.2K for a bandwidth of 0.2 to 0.4 $\mu$m.

The present invention utilizes high spectral and radiometric resolution imaging spectrometers, namely visible-infrared (0.4–1.1 micron) for the first array 14, solar reflected infrared (1.4–2.5 micron) for the second array 16, and thermal infrared (8–12 micron) for the third array 18. The sensor processing unit 12, containing the spectrometer assemblies 14, 16, and 18, is mounted in a known airborne platform (not shown) having the capability of informing the central processor of flight conditions, such as altitude, attitude and ground speed. The spectrometer arrays 14, 16, 18 are pre-flight calibrated for the particular survey to be conducted. As the survey progresses, the signal discriminator optics acquire images of contiguous registered spectral bands such that, for each element on the ground "pixel", a complete reflectance or emittance spectrum can be obtained from the surface surveyed. The recorded image data can be viewed in real-time by display 30 while airborne, or processed by printer 32 or recording means 34 for preselection of individual bands or for the whole spectrum of bands for various applications.

The capacity of the system to resolve features on the ground, in terms of spatial resolution, depends on a number of parameters, such as the instantaneous field of view, and the altitude and speed of the aircraft, known as the V/H ratio. The former is pretty much determined by the optics system 20 while the latter is determined by known means in the navigation computer 26, including the platform stabilization 28, and fed to the central processor 24. The quality of the signal to identify features on the ground, in terms of spectral resolution, depends on having arrays of detectors 14, 16, 18 which have good signal-to-noise ratios.

Known image processing techniques can be used for processing of the image data. The central processor 24 allows the operator to convert image data into radiometric units, and to perform atmospheric correction and geometric rectification, both necessitated by distortions produced by the instrument and airborne platform motion. The operator can enhance the data by combining bands, creating ratios, performing statistical analysis and applying numerical classification techniques.

Thermal inertia is a measure of the thermal response of a material to temperature changes. The units are calories per square centimeter per second square root per degree centigrade (Cal.Cm$^{-2}$.Sec$^{\frac{1}{2}}$.° C.$^{-1}$). The thermal inertia is defined as:

$$T_I = (\kappa \rho C)^{\frac{1}{2}}$$

where:
$\kappa$ = thermal conductivity
$\rho$ = density of material
C = thermal capacity The thermal inertia can be determined by measuring the conductivity, density and thermal capacity of materials. However, by measuring the maximum and minimum radiant temperature during a diurnal solar cycle, the apparent thermal inertia of materials can be determined. The procedure is as follows:

1. Conducting a first airborne mission under conditions of expected lowest solar heating cycle and activating thermal infrared sensor means to acquire radiant temperatures in digital form.

2. Conducting a second airborne mission under conditions of expected maximum solar heating cycle and activating imaging spectrometers means scanning from visible to thermal infrared to acquire reflected energy and radiant temperatures in digital form.

3. Calculating $\Delta T$, which is the difference between the maximum and minimum temperatures occurring during the diurnal cycle from the first and second surveys.

4. Calculating the albedo (a) from the visible bands of the second survey, the albedo being the ratio of the amount of energy reflected by a material to the energy incident on the surface of the material.

5. Calculating the apparent thermal inertia by the equation.

$$ATI = \frac{1-a}{\Delta T}$$

Figure 2:
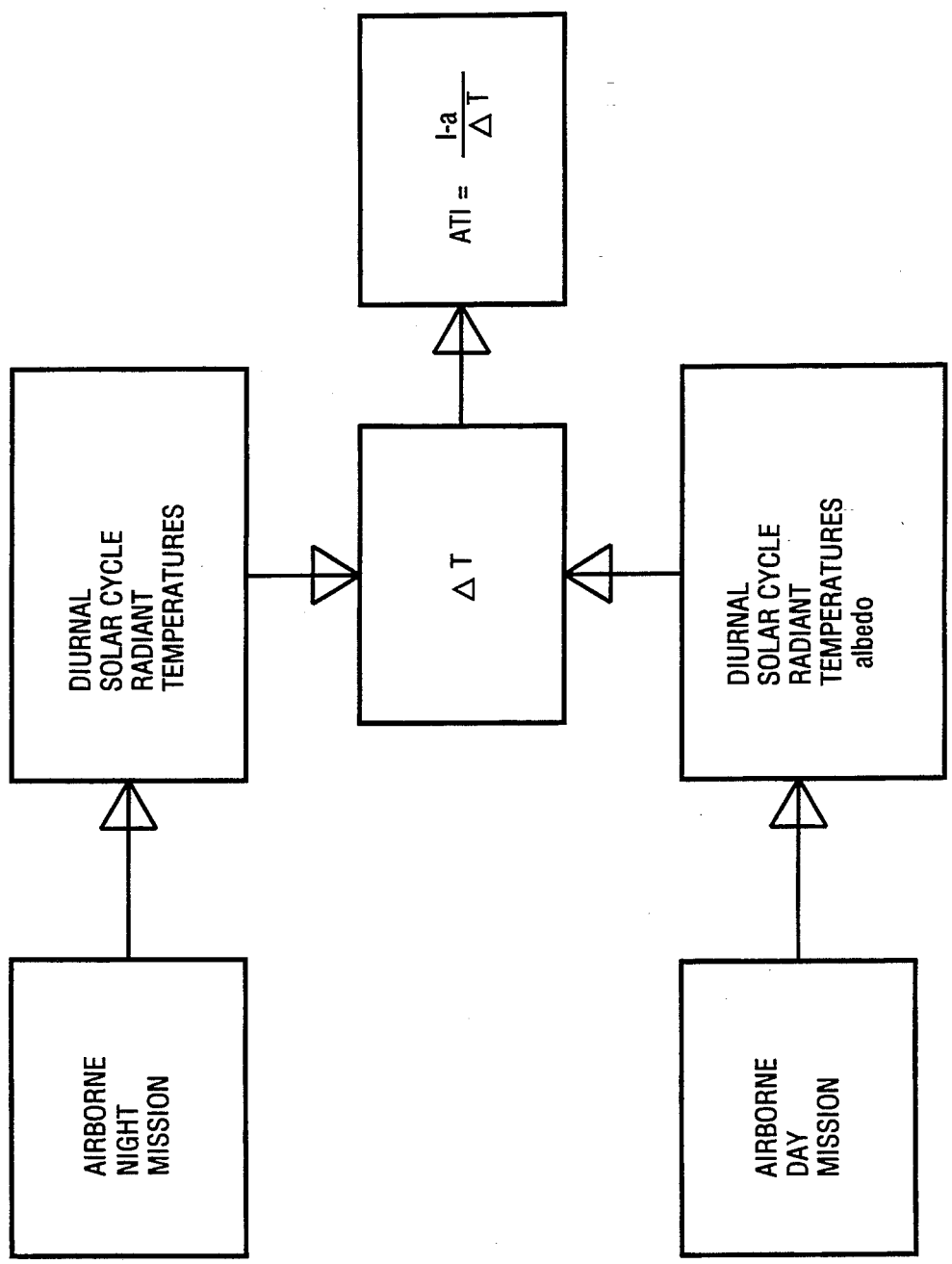
FIG. 2 is a block level schematic showing the function of the subject invention.

FIG. 2 illustrates the steps used to calculate the apparent thermal inertia. In this drawing, $\Delta T$ is the difference between the maximum and minimum temperature during the diurnal cycle, $a$ is the albedo and ATI is the apparent thermal inertia. The minimum and maximum radiant temperatures are acquired during the first and second surveys using the thermal sensor arrays. The albedo is acquired with the imaging spectrometer during the second survey. In accordance with the flight specifications, the apparent thermal inertia can be calculated in real time during the second mission as the data are being recorded. The display provides real-time interpretation when searching for a particular target that requires a closer examination. The requirement to co-register the picture elements (pixels) from the first and second surveys is achieved by using a global positioning system (GPS). For example, when using a differential GPS system, a first receiver is placed on the airborne platform and a second receiver is placed on the ground at a benchmark. Thus accurate ground position is obtained for each pixel for both of the first and second airborne surveys.

Post-flight processing, which may be described as a post-flight survey of the data allows use of more complex algorithms for analysis and display of the imaging data and thermal inertia. Software can be used to remove atmospheric effects, to compensate for shadows due to changes in terrain elevation by comparing solar elevation and azimuth with digital terrain data, and to apply thermal models to define heat flow patterns.

The present invention may be subject to many modifications and changes without departing from the spirit or essential characteristics thereof. The present embodiment should therefor be considered in all respects as being illustrative rather than restrictive of the scope of the invention as defined by the appended claims.

I claim:

1. A method for airborne surveying to acquire, process and calculate the apparent thermal inertia of earth surface materials during flight and post-flight surveys comprising the steps of:

conducting first and second airborne surveys of the materials to measure maximum and minimum radiant temperatures respectively.

determining the albedo of the materials from the data obtained in one of the surveys;

calculating the apparent thermal inertia of the materials using the albedo and a comparison between the two airborne flight surveys; and using differential global positioning means to obtain the respective ground positions along the materials being surveyed for each pixel of the two surveys.

2. The method according to claim 1 and further comprising the step of:

post-flight processing of the first and second surveys of the materials for further enhancement of the apparent thermal inertia including application of thermal models to define heat flow patterns from the interior and surface of the earth during the diurnal solar cycle.

3. The method of claim 1 further comprising the step of:

providing a real time display of apparent thermal inertia as a function of position on the earth's surface.

* * * * *